United States Patent
Qi

(10) Patent No.: US 8,057,133 B2
(45) Date of Patent: Nov. 15, 2011

(54) MACHINING OF ALUMINUM SURFACES

(75) Inventor: Yue Qi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 966 days.

(21) Appl. No.: 12/019,139

(22) Filed: Jan. 24, 2008

(65) Prior Publication Data

US 2009/0191013 A1 Jul. 30, 2009

(51) Int. Cl.
*B23B 51/06* (2006.01)

(52) U.S. Cl. .......................................... 408/1 R; 408/56

(58) Field of Classification Search .................... 408/56, 408/61, 1 R, 57, 58, 59; 409/135, 136; 407/11
See application file for complete search history.

(56) References Cited

U.S. PATENT DOCUMENTS

| | | | | |
|---|---|---|---|---|
| 3,990,332 | A * | 11/1976 | Flom et al. ...................... | 82/1.11 |
| 5,645,382 | A * | 7/1997 | Homanick et al. ............ | 409/131 |
| 5,651,295 | A | 7/1997 | Tumey et al. | |
| 2007/0104953 | A1 | 5/2007 | Sugita | |

FOREIGN PATENT DOCUMENTS

| JP | 61-232363 | 10/1986 |
|---|---|---|
| JP | 2005-022073 | 1/2005 |

OTHER PUBLICATIONS

Konca, E., Cheng, Y. -T., Weiner, A. M., Dasch, J. M. & Alpas, A. T. (2007). The Role of Hydrogen Atmosphere on the Tribological Behavior of Non-Hydrogenated DLC Coatings against Aluminum. Tribology Transactions, 50(2), 178-186.*

Yue Qi, Erkan Konca, Ahmett T. Alpas; "Atmospheric effects on the adhesion and friction . . . "; Publication; May 2, 2006; Surface Science 600 (2006); pp. 2955-2965.

International Search Report for Application No. PCT/US2009/030902 dated Aug. 31, 2009.

Written Opinion of the International Searching Authority for application No. PCT/US2009/030902 dated Aug. 31, 2009.

* cited by examiner

*Primary Examiner* — Daniel W. Howell
*Assistant Examiner* — Paul M Janeski
(74) *Attorney, Agent, or Firm* — Reising Ethington P.C.

(57) ABSTRACT

Machining of aluminum workpieces with diamond or diamond-like carbon-surface coated tools may be conducted in an atmosphere containing hydrogen gas at a partial pressure effective for hydrogen to react with carbon atoms at the surface to form C—H bonds that resist adherence of aluminum to the tool surface. Suitably, hydrogen or a hydrogen-containing gas mixture is confined at the interface of tool and workpieces at the machining site. Hydrogen partial pressure may be determined for a tool-workpiece-machining temperature combination by calculation or experiment.

12 Claims, 1 Drawing Sheet

MACHINING OF ALUMINUM SURFACES

TECHNICAL FIELD

The disclosure pertains to the machining of aluminum workpiece surfaces using machining tools with hard carbon surfaces for material removal. More specifically, the disclosure pertains to such machining operations in which a hydrogen atmosphere is used to reduce adhesion of aluminum to the carbon tool or carbon coated tool surfaces and to minimize or avoid the use of machining liquids.

BACKGROUND OF THE INVENTION

Aluminum alloy workpieces, especially castings, are used in making many articles of manufacture. In the automobile industry, for example, many engine and transmission parts, chassis parts, body parts, and interior parts are made of silicon-containing aluminum alloy castings. Many of these parts such as engine blocks, cylinder heads, crank cases, transmission cases, and the like are initially formed as castings using sand molding, permanent mold, high pressure die casting, and lost foam processes. Following these casting process, many surfaces of the parts still have to be machined to specified dimensions within very close tolerances.

Aluminum alloy 319 ("AA319") is an example of an aluminum alloy that is used to form cast shapes of many of the above parts. A representative nominal composition, by weight, of AA319 is 5.5 to 6.5% silicon, up to about 1% iron, 3 to 4% copper, about 0.5% manganese, about 0.1% magnesium, about 0.35% nickel, 1-3% zinc, about 0.25% titanium, and the balance substantially aluminum. The silicon content contributes fluidity to the molten alloy for the pouring of intricate cast shapes. But the silicon, and sometimes other alloying elements, form secondary phases in the predominately aluminum matrix that tend to abrade machining tools.

Engine and transmission castings, for example, may require precision machining processes such as milling, drilling, honing, and reaming. In these machining processes the casting is carefully positioned in a fixture and a cutting tool, carried and powered by an operator or computer controlled machine tool, cuts a cast surface to remove chips of workpiece metal to bring the surface to a specified finish quality and dimension. The tools for metal removal may be made of a hard material, especially the surface of the tool that engages the workpiece. For example, tools may be made of a tool steel composition or of a sintered composition comprising tungsten carbide, or the like. Sometimes the cutting surface of the tool may be coated with a hard carbon material such as polycrystalline diamond or diamond-like carbon.

The tendency of Al and its alloys to adhere to tool surfaces may create enormous difficulties in metal forming operations such as rolling, forging, casting, extrusion, and machining. Aluminum has a 3 to 6 nm thick natural oxide layer, which is locally destroyed during the forming process, exposing nascent Al metal that is highly chemically reactive. Once the oxide layer is destroyed, the onset of gross adhesive transfer to the tool surface is likely: this introduces process instability and threatens the success of the deformation process.

In conventional metal removal operations, the machined surface may be flooded with a machining liquid (water based or oil based) for the purposes of cooling and lubricating the region impacted by the cutting tool. The lubrication promotes cutting by minimizing adherence between the tool and the machined surface. Ultimately, the machining liquid must be drained from the machining area for recovery processing and re-use, or for disposal.

Wear resistance of a tool for cutting or otherwise machining a workpiece may be improved by coating a contact area of the tool with a hard material layer. Suitable hard coating materials for these tools often include carbon, common examples of which are diamond, hard carbon, and various forms of mixtures of $sp^2$ and $sp^3$ hybridized amorphous carbon.

Wet or dry machining processes may be used to machine a workpiece using the hard coated tools. Drawbacks with using wet machining processes, for example, include relatively high costs of performing the wet machining process and, in some cases, environmental concerns potentially linked to use of coolants or other machining fluids. Dry machining processes, especially for machining soft metals such as aluminum alloys, for example, may lead to adhesion of the aluminum alloy workpiece to the tool surface, thereby diminishing the operative life of the tool.

It is an object of this invention to provide a method for machining aluminum alloy workpieces (e.g., castings) without the use of such a machining liquid. In accordance with this invention such a practice is termed "dry machining."

SUMMARY OF THE INVENTION

An embodiment of this invention comprises the use of machining tools having hard carbon surfaces. A hard carbon surface may, for example, comprise bonded polycrystalline diamond particles, a chemical vapor deposited (CVD) diamond coating, or a coating of a diamond-like carbon composition. It is this surface of hard carbon material on a machining tool that engages the surface of an aluminum alloy workpiece and bites into the surface, removing chips or particles of aluminum material from the workpiece. Thus, these tool surfaces present carbon faces to the predominately aluminum surface.

In the case of a diamond-containing tool face, the carbon atoms are largely joined in $sp^3$ carbon-to-carbon bonds. In the case of diamond-like carbon tool faces, the surfaces often comprise particles of hard carbon in which atoms are largely joined in a mixture of $sp^2$ and $sp^3$ type carbon-to-carbon bonds with or without hydrogen content. While these tool surfaces are hard and resist fracture when removing aluminum chips from the workpiece, aluminum does adhere to the carbon tool surface and damage the tool, or the part, or the finished surface, especially in vacuum or an inert gas environment. Heretofore, such tool or workpiece damage has been corrected by use of a machining fluid.

In accordance with embodiments of this invention, the interface of the carbon surface of the tool and the aluminum workpiece surface is flooded, immersed, or otherwise covered with a suitable hydrogen-containing gas atmosphere. Many carbon coatings are originally terminated by hydrogen at the top surface, however, they are subject to damage in the machining process, and the exposed carbon atoms with dangling bonds are very active to adhere to Al. The blanketing atmosphere presents a suitable hydrogen partial pressure at the carbon tool surface for chemical reaction with facial carbon atoms. The hydrogen pressure is also used to maintain a fully hydrogenated carbon surface that resists adhesion to the aluminum and reduces friction between the tool and workpiece. Higher pressures of hydrogen than the minimum may be used. At suitable hydrogen partial pressures, the hydrogen reacts with carbon atoms at the tool surface and provides a tool surface characterized by fully hydrogenated carbon. The hydrogenated carbon surface resists bonding with the aluminum workpiece, enabling the machining to be conducted without other lubrication.

In an exemplary practice of the invention, an aluminum alloy workpiece is brought to a machining station using a cutting or machining tool having a hard carbon surface for metal removal. In a preferred embodiment, the machining interface is provided with an enclosure for at least the tool and workpiece surface. Hydrogen gas, or a hydrogen-containing gas (such as a mixture of hydrogen and nitrogen or hydrogen and helium), is delivered to the enclosure so that at least the tool-workpiece engaging surfaces are covered and exposed to suitable hydrogen partial pressure for absorption of hydrogen by the hard carbon tool material before machining commences. The hydrogen atmosphere is maintained at the machining interface throughout a machining operation. At the completion of the intended machining of the workpiece, the machined workpiece is then removed from the machining site. A succession of such workpieces may be machined at a work stage utilizing the hydrogen or hydrogen-containing atmosphere.

A required hydrogen partial pressure may vary depending on a specific machining operation on a specific aluminum or aluminum alloy workpiece. And a suitable hydrogen partial pressure is also a function of the temperature of the work site, especially the temperature of the hard carbon tool surface. Information concerning the variance of hydrogen partial pressure with tool or machining environment temperature is provided below in this specification. Hydrogen may be delivered to a work site in different gas compositions ranging from substantially pure hydrogen to mixtures of hydrogen with other gasses such as air, or nitrogen, or with an inert gas(es).

Ambient air, of course, may be present at or near the work site and attention must be given to the possibility of the unintended formation of combustible hydrogen-air mixtures around the worksite. Information concerning such mixtures is also provided below in this specification.

As suggested above, the machining vicinity may be provided with a suitable enclosure for delivery of a hydrogen-containing gas to the site, for maintenance of desired hydrogen partial pressure at the site, and, as may be necessary, for removal of hydrogen gas that is contaminated or otherwise unsuitable for further usage at the site. It is recognized that there may be many different ways of providing for the use of hydrogen at a machining operation in accordance with this invention.

These and other objects and advantages of the invention will become more apparent from a detailed description of preferred embodiments which follows.

where $\mu(T)=(53.65T-1.66\times10^{-3}T^2-27.37T \ln T)\times1.04\times10^{-5}-0.0483$, and where T is the absolute temperature in Kelvin (K).

Figure 2:
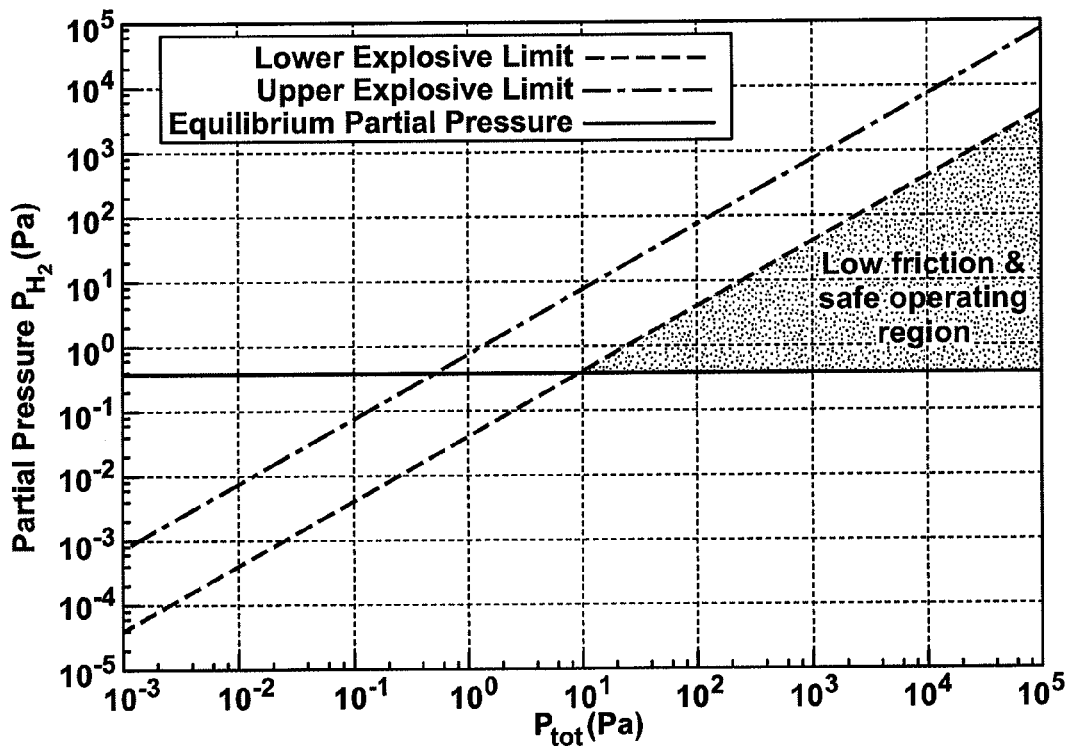

FIG. 2 is a graph of the upper and lower explosive limits of hydrogen gas content in a hydrogen-air mixture. The required partial pressure of hydrogen ($P_{H2}$) in Pascals at 300K for forming a hydrogenated surface on a diamond (111) surface is plotted versus the total pressure ($P_{tot}$) of hydrogen-air mixtures in Pascals. The grey region in the FIG. 2 graph indicates hydrogen partial pressures that are below the combustible mixtures with air while still providing a suitable hydrogen partial pressure for reaction with a diamond (111) surface at about room temperature.

DESCRIPTION OF PREFERRED EMBODIMENTS

This invention is applicable, for example, in making aluminum alloy parts in large volume for automotive applications. Vehicle engine and transmission parts are examples of such parts. Many of the parts are made of aluminum-silicon based casting alloys which contain abrasive microstructural constituents. Most automotive castings require some machining to produce surfaces to a shape and/or dimensional specification. The machining requires the use of high quality and expensive cutting tools such as drills, reamers, and milling and honing tools. Heretofore the machining has also required the use of machining fluids for part and tool protection and for machine chip removal. The machining practices have required close management to produce high quality cast parts with good tool life and related management of machining costs.

In accordance with embodiments of this invention, the machining interface of a machining tool with a hard carbon machining surface and an aluminum alloy workpiece is maintained in hydrogen atmosphere or an atmosphere containing predetermined hydrogen content. In one embodiment, the atmosphere is contained around the tool and workpiece(s) interface(s) during machining operations. The enclosure may have more than one chamber to permit movement of workpieces to and from a machining site. Workpiece access chambers and removal chambers, e.g., upstream and downstream of a machining operation chamber, may be provided with gas compositions that complement the hydrogen content of the machining chamber. The hydrogen content of the machining chamber provides a hydrogen partial pressure that is sufficient to form and maintain a protective hydrogenated coating on a hard carbon tool surface.

In an embodiment of the invention, a required hydrogen composition may be predetermined by analysis or experimentation to provide a needed hydrogen partial pressure for the alloy composition being machined, for the hard carbon tool composition, and for the temperatures encountered by the respective compositions during machining. For example, the required hydrogen partial pressure (s), $P_{H2}$, for a machining temperature or temperature range may be selected by reference to FIG. 1 (and the related equation). Examples of determination of hydrogen partial pressures follow in this text. The gas content in the machining chamber may be monitored throughout machining operations as required to maintain a suitable hydrogenated surface on the carbon faced tool.

In one embodiment, the range of hydrogen partial pressure to minimize friction at diamond and diamond-like carbon coated tool surfaces for dry machining of aluminum was predicted. Diamonds consist of true, long range crystalline (generally of cubic crystal structure) arrangements of carbon atoms which have $sp^3$ bonds. Generally, diamond-like carbon (DLC) materials are more amorphous, mixed clusters of carbon atoms connected with $sp^2$ and $sp^3$ bonds. In hydrogenated DLC, hydrogen atoms are bonded to some of the carbon atoms.

Testing has demonstrated that a suitable hydrogen atmosphere can reduce friction. A pin-on-disc machine, wherein a stationary pin is in contact with a rotating disc, may be used to analyze wear and friction. The coefficient of friction is measured as wear occurs, and the amount of material removed from the rotating disc can be determined by weighing or by measuring the resulting wear track. Pin-on-disc friction tests of aluminum pin on a non-hydrogenated diamond-like carbon (DLC) coated disk were run and showed ultra low friction in high hydrogen pressure. Non-hydrogenated DLC coated (<2 atomic % H) discs were run against Aluminum Alloy 319 pins in an atmosphere of hydrogen mixed with helium. The least amount of wear and lowest coefficient of friction values (0.015) were achieved when non-hydrogenated DLC coated (<2 atomic % H) discs were slid against AA 319 pins in a 100% hydrogen atmosphere. No sign of material transfer from the aluminum pin to the non-hydrogenated DLC coating surface was observed in hydrogen gas.

Dry machining of aluminum-silicon alloy components is possible if non-hydrogenated DLC coated tools, for example drills, are employed and hydrogen gas is fed to the cutting zone. Since the adhesion between DLC and aluminum is mainly caused by strong bonds formed between aluminum and the carbon atoms with un-saturated sp bonds (sometimes referred to as termed dangling bonds) in DLC, a non-reconstructed diamond surface can be used as a model surface for non-hydrogenated DLC. Hydrogen molecules ($H_2$) will dissociate to hydrogen radicals (H*) at a diamond tool surface and then passivate the surface by reacting with it to form C—H bonds. To simulate the adhesion and adhesive transfer between aluminum atoms and DLC coating in hydrogen, the ideal work of adhesion at the Al/H terminated diamond interface was calculated. The calculated (using Density Functional Theory) ideal work of separation at Al/C—H terminated diamond interface was 0.008 mJ/m$^2$, which is orders of magnitude lower than the work of de-cohesion of Al, 1.56 J/m$^2$. This suggests that Al will not stick to —H terminated diamond surface, or to DLC coatings in a suitable hydrogen environment. In comparison, the ideal work of separation of aluminum with a non-hydrogen-passivated-diamond surface is 4.08 J/m$^2$, larger than the work of de-cohesion of Al (1.56 J/m$^2$). Therefore, when aluminum is in contact with a non-hydrogen-passivated-diamond surface, it will transfer to the diamond surface.

The direction of the hydrogenation reaction is very sensitive to the temperature and partial pressure of the gas phase at the tool surface. The tribological chemical reactions occurring at the diamond and DLC surfaces will change with environment, and, in turn, change the friction and wear behavior. Therefore, the relationship between hydrogen termination with both the partial pressure of $H_2$ and temperature based on the equilibrium state of the surface reaction were determined. By combining first principles modeling and thermodynamic calculations, the equilibrium partial pressure of hydrogen resulting in low friction at the aluminum/diamond interface was calculated. Then a safe operation hydrogenous atmosphere window for dry machining of aluminum with DLC and diamond coated tools was predicted over a wide range of potential machining temperatures.

Figure 1:
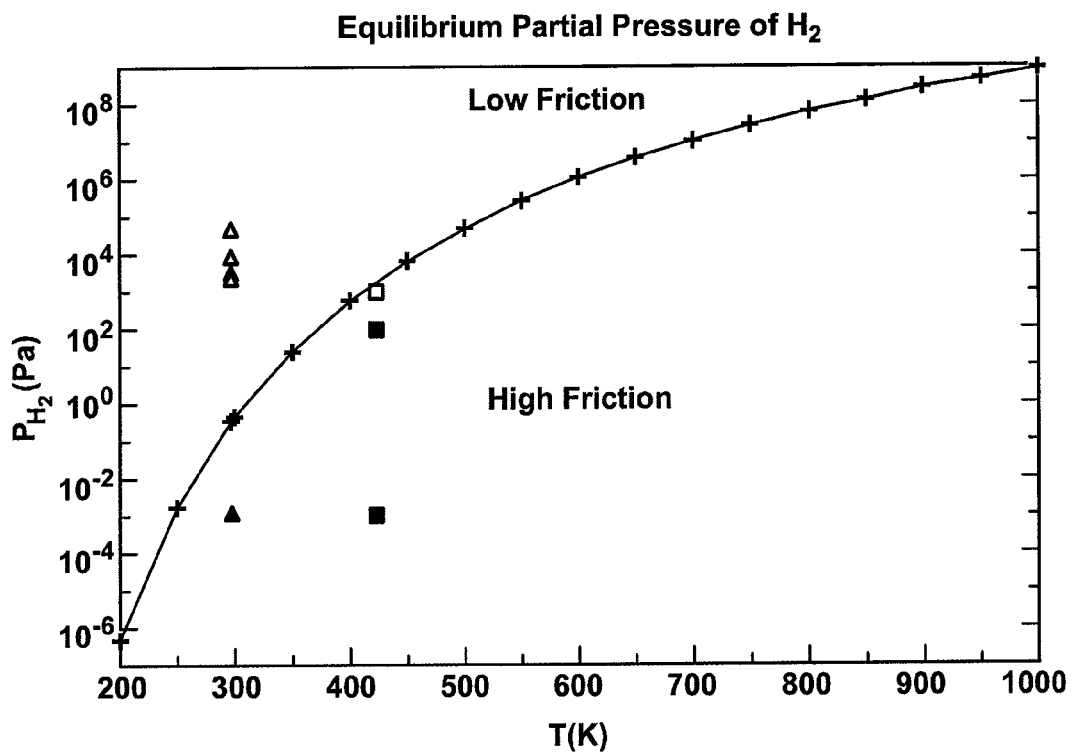
FIG. 1 is a graph of the equilibrium partial pressure of hydrogen gas ($P_{H2}$), in Pascals (Pa), versus temperature (K) for forming a hydrogenated surface on a diamond (111) surface, wherein the partial pressure of hydrogen as a function of temperature is $$p_{H2} = e^{\frac{-0.68875 - \mu(T)}{8.62 \times 10^{-5} T}} \times 1.01 \times 10^5 \text{ Pa},$$

FIG. 1 is a graph showing the calculated equilibrium partial pressure of $H_2$, from 200 K to 1000 K, for reaction of hydrogen radicals with exposed carbon atoms in the (111) crystal surface termination of diamond particles in a polycrystalline diamond-face tool. The partial pressure to achieve low friction can be calculated at any given temperature, using the following equations:

$$p_{H2} = e^{\frac{-0.68875 - \mu(T)}{8.62 \times 10^{-5} T}} \times 1.01 \times 10^5 \text{ Pa, and}$$

$$\mu(T) = (53.65T - 1.66 \times 10^{-3} T^2 - 27.37T \ln T) \times 1.04 \times 10^{-5} - 0.0483,$$

and where T is the absolute temperature in Kelvin (K). In general, this calculated value will be the lowest partial pressure of hydrogen for achieving low friction. Higher pressures of hydrogen may be used. In some machining embodiments, hydrogen may be mixed with a suitable non-reactive diluent gas, for example argon, helium, or nitrogen. In another embodiment, hydrogen may be mixed with suitable proportions of air.

The predicted high and low friction regions are marked in FIG. 1. The squares indicate friction tests have been done on non-hydrogenated DLC at room temperature, and triangles on hydrogenated DLC (H content: 34 atomic %) at 150° C. The filled symbols are for high friction (~0.8) observed experimentally. The unfilled symbols are for low friction (~0.01) observed experimentally. The predicted high friction (0.6~1.0) found at CVD diamond on diamond interface also overlapped with testing conditions represented by the solid triangle.

Referring to FIG. 1, when the partial pressure of hydrogen ($P_{H2}$) is above the equilibrium pressure, a fully passivated diamond/DLC surface is favored, thus a low or ultra low friction is expected. When $P_{H2}$ is less than the equilibrium pressure, the atomic hydrogen at the diamond surface will desorb from the surface, therefore exposing the dangling bonds at the diamond/DLC surface, resulting in a higher friction. FIG. 1 shows that the equilibrium partial pressure increases with temperature. It almost exponentially increases with temperature especially at temperatures below 400 K. This means that more hydrogen is needed to maintain the hydrogen coverage on diamond surface at higher temperatures. For example, at room temperature and below, the equilibrium partial pressure is no more than 1 Pa; while at about 520 K, 1 atmosphere of hydrogen is required to maintain a full coverage of hydrogen on diamond (111) surface. Therefore, ultra low friction can be achieved at a fully hydrogen passivated diamond/DLC surface, by either increasing partial pressure of hydrogen, increasing hydrogen content in the coating, or reducing the temperature. The equilibrium pressure separates the testing environment (partial pressure and temperature) into two regions: fully passivated diamond/DLC surface corresponding to low or ultra-low friction; and diamond or DLC surface with the dangling bonds resulting in strong adhesion and high friction. Dramatic changes in friction properties have been observed when the testing condition jumped from one region to the other, and these experiments are summarized in FIG. 1.

Although the model was based on diamond (111) surface, its accuracy and generality to all carbon based surfaces was validated by the good agreement of the model and various experimental data as shown in FIG. 1. Thus the above calculations and experiments provide a basis for applying and utilizing hydrogen or hydrogen-containing atmospheres at a DLC/Al interface in dry machining of aluminum workpieces.

The equilibrium partial pressure data of FIG. 1 (and the related equation) show that partial pressures of hydrogen below one atmosphere pressure are suitable at relatively low temperatures for use at a diamond/Al interface or DLC/Al interface in dry machining of aluminum workpieces. The data suggests that the machining interface may be flooded with pure hydrogen or with hydrogen-containing gas mixtures (e.g., hydrogen and nitrogen) to obtain and maintain a suitable hydrogen partial pressure for the machining operation. Such mixtures may, for example, be confined at the machining site during machining operations and later withdrawn to storage or disposed of. For example, they may be released into the atmosphere. In other embodiments of the invention, one may choose to use hydrogen-air mixtures to provide a useful hydrogen partial pressure at the machining site. In any usage of hydrogen one must recognize and manage the possibility of forming combustible mixtures of hydrogen with air.

In general, it is suggested that the hydrogen concentrations within explosive limits (4.0~74.2 volume percentage in air at room temperature) be avoided when hydrogen is mixed with air. This may arise momentarily if a hydrogen-containing gas is released into air. Or the mixtures may persist where hydrogen-air mixtures are used at a machining site. Suitable hydrogen partial pressures for dry machining Al with DLC coated tools has been calculated, as shown in FIG. 1. FIG. 2 shows the upper and lower explosive limits of hydrogen in air at room temperature as functions of partial pressure of hydrogen with total air/hydrogen pressure. Similar to FIG. 2, one can plot the explosive limit of hydrogen-air mixtures and the partial pressure of hydrogen to achieve low friction carbon based coating surfaces at other desired temperatures in determining safe machining conditions.

Referring to FIG. 2, the mixtures of hydrogen in air within the highlighted region are predicted to be within the safe operating region while retaining low friction on diamond and DLC. Within this highlighted range, full coverage of diamond and DLC by hydrogen as well as safe operating may be obtained, of partial pressure of hydrogen under one atmosphere total pressure at room temperature. Accordingly, low friction and wear can be expected with low risk of explosion in the mixture of hydrogen and air, which can serve as a safe gaseous lubricant of friction on diamond and DLC.

Dry machining eliminates the need to use cutting fluids or metal removal fluids. This saves significant amounts of money since the costs related with the maintenance, filtration, and disposal of cutting fluids will be eliminated. It also eliminates the hazardous effects of cutting fluids on the environment and on the machine shop workers.

In accordance with the invention, the substrate to be machined comprises aluminum. Various aluminum alloys may be used in the dry machining process. These elements may significantly increase the machinability of the aluminum alloys. In some embodiments of the invention, the aluminum substrate may be modified to contain relatively small amounts of certain finely dispersed elements that are softer and lower melting than the aluminum casting alloy matrix material, and which significantly increase the machinability of surfaces of a casting into which they are incorporated. These elements include bismuth, indium, lead, and tin and one or more of them may be added to the casting alloy. These lubricity-imparting additives are not very soluble in the solidified aluminum rich matrix phase of the castings although they may combine with alloying constituents such as magnesium. Thus, they are dispersed as very small, globular bodies in the cast metallurgical microstructure. Sufficiently low amounts of one or more of soft elements are added to the casting alloy so that the dispersed, relatively low melting, soft phase (either as a pure additive phase or mixed with another constituent of the alloy in a low melting phase) is present in the solid casting more or less uniformly through the casting, and surfaces of choice can be machined regardless of the position of the machined surface. These additions of soft metals to an aluminum workpiece complement the use of a hydrogen atmosphere in accordance with this invention.

The scope of the invention is limited only by the following claims.

The invention claimed is:

1. A method of dry machining an aluminum alloy workpiece with a tool having a carbon material cutting surface, the carbon material being characterized by $sp^2$ and/or $sp^3$ carbon-to-carbon bonding, the method comprising:
   bringing the aluminum alloy workpiece and carbon material cutting surface of the tool into machining engagement in which the tool removes aluminum material from the workpiece; and
   continually maintaining an atmosphere containing hydrogen gas at the region of machining engagement, the atmosphere presenting sufficient hydrogen partial pressure at the tool-workpiece engaging surfaces, at the temperature of the engaging surfaces, to form and maintain a hydrogenated carbon layer on the carbon material cutting surface for minimizing adherence of aluminum to the carbon cutting surface.

2. A method of dry machining an aluminum alloy workpiece as set forth in claim 1 wherein the minimum hydrogen partial pressure is at least the value determined by the following:

$$p_{H2} = e^{\frac{-0.68875-\mu(T)}{8.62\times 10^{-5}T}} \times 1.01 \times 10^5 \text{ Pa, where}$$

$$\mu(T) = (53.65T - 1.66\times 10^{-3}T^2 - 27.37T\ln T)\times 1.04\times 10^{-5} - 0.0483,$$

and where T is the absolute temperature in Kelvin.

3. A method of dry machining an aluminum alloy workpiece as set forth in claim 1 further comprising controlling the temperature of the tool and maintaining a hydrogen partial pressure for ongoing formation of the hydrogenated carbon on the carbon material cutting surface at the controlled temperature.

4. A method of dry machining an aluminum alloy workpiece as set forth in claim 1 further comprising periodically measuring the temperature of the tool and adjusting, if and as necessary, the hydrogen partial pressure for ongoing formation of the hydrogenated carbon on the carbon material cutting surface at the measured temperature.

5. A method of dry machining an aluminum alloy workpiece as set forth in claim 1 wherein the carbon material cutting surface initially comprises a non-hydrogenated diamond-like carbon coating.

6. A method of dry machining an aluminum alloy workpiece as set forth in claim 1 wherein the carbon material cutting surface comprises diamond.

7. A method of dry machining an aluminum alloy workpiece as set forth in claim 1 wherein the carbon material cutting surface comprises CVD diamond coating.

8. A method of dry machining an aluminum alloy workpiece as set forth in claim 1 wherein the aluminum alloy surface comprises aluminum-silicon alloy.

9. A method of dry machining an aluminum alloy workpiece as set forth in claim 1 wherein the tool is a drill.

10. A method of dry machining an aluminum alloy workpiece as set forth in claim 1 wherein the atmosphere containing hydrogen gas is enclosed around the region of machining engagement.

11. A method of dry machining an aluminum alloy workpiece as set forth in claim 1 wherein the atmosphere containing hydrogen gas also contains an inert gas.

12. A method of dry machining an aluminum alloy workpiece as set forth in claim 11 wherein the inert gas comprises one of helium, nitrogen, or argon.

* * * * *